United States Patent
Li et al.

(10) Patent No.: US 11,750,776 B2
(45) Date of Patent: Sep. 5, 2023

(54) NETWORK CAMERA, VIDEO MONITORING SYSTEM AND METHOD

(71) Applicant: Hangzhou Hikvision Digital Technology Co., Ltd., Zhejiang (CN)

(72) Inventors: Wenwei Li, Zhejiang (CN); Peng Xu, Zhejiang (CN)

(73) Assignee: HANGZHOU HIKVISION DIGITAL TECHNOLOGY CO., LTD., Zhejiang (CN)

(*) Notice: Subject to any disclaimer, the term of this patent is extended or adjusted under 35 U.S.C. 154(b) by 0 days.

(21) Appl. No.: 17/753,223

(22) PCT Filed: Aug. 14, 2020

(86) PCT No.: PCT/CN2020/109328
§ 371 (c)(1),
(2) Date: Feb. 24, 2022

(87) PCT Pub. No.: WO2021/036832
PCT Pub. Date: Mar. 4, 2021

(65) Prior Publication Data
US 2022/0279111 A1    Sep. 1, 2022

(30) Foreign Application Priority Data

Aug. 29, 2019 (CN) .......................... 201910808803.2

(51) Int. Cl.
*G06F 7/24* (2006.01)
*H04N 7/18* (2006.01)
(Continued)

(52) U.S. Cl.
CPC ............... *H04N 7/183* (2013.01); *G06F 7/24* (2013.01); *G06V 10/75* (2022.01); *G06V 10/761* (2022.01);
(Continued)

(58) Field of Classification Search
CPC ...... H04N 7/183; H04N 23/661; H04N 23/60; H04N 7/18; H04N 23/80; G06F 7/24;
(Continued)

(56) References Cited

U.S. PATENT DOCUMENTS

| 10,218,506 B1 | 2/2019 | Bhabbbur et al. |
| 2008/0080748 A1 | 4/2008 | Sukegawa et al. |

(Continued)

FOREIGN PATENT DOCUMENTS

| CN | 106790054 | 5/2017 |
| CN | 107590212 | 1/2018 |

(Continued)

OTHER PUBLICATIONS

Extended European Search Report issued in Corresponding European Application No. 20857136.4, dated Oct. 7, 2022.
(Continued)

*Primary Examiner* — Stephen P Coleman
(74) *Attorney, Agent, or Firm* — NORTON ROSE FULBRIGHT US LLP

(57) ABSTRACT

The application provides a network camera, a video monitoring system and a method. The network camera comprises: an image sensor, a processor, a memory and a network communication interface; the processor is configured for matching a current image acquired by the image sensor with an image stored in a second storage unit of the memory, so as to obtain a similarity value representing a matching result, and storing an image satisfying a similarity condition in another storage unit of the network camera, reducing the difficulty of image comparison and improving the accuracy of the comparison result.

14 Claims, 6 Drawing Sheets

(51) Int. Cl.
*G06V 10/74* (2022.01)
*G06V 10/98* (2022.01)
*H04N 23/661* (2023.01)
*G06V 10/75* (2022.01)
*G06V 40/16* (2022.01)

(52) U.S. Cl.
CPC .......... *G06V 10/993* (2022.01); *G06V 40/172* (2022.01); *H04N 23/661* (2023.01)

(58) Field of Classification Search
CPC ...... G06F 18/22; G06V 10/75; G06V 10/761; G06V 10/993; G06V 40/172; G06V 20/52; G06V 40/16
USPC ..................................................... 348/207.99
See application file for complete search history.

(56) References Cited

U.S. PATENT DOCUMENTS

| | | | |
|---|---|---|---|
| 2016/0088326 A1 | 3/2016 | Solomon | |
| 2017/0140212 A1* | 5/2017 | Lo | G06V 40/171 |
| 2018/0225506 A1 | 8/2018 | Lambert et al. | |
| 2020/0401857 A1 | 12/2020 | Lu et al. | |

FOREIGN PATENT DOCUMENTS

| | | |
|---|---|---|
| CN | 108429782 | 8/2018 |
| CN | 108921150 A | 11/2018 |
| CN | 109241897 A | 1/2019 |
| CN | 109658572 | 4/2019 |
| CN | 109800691 A | 5/2019 |
| CN | 109858371 | 6/2019 |
| CN | 109936522 | 6/2019 |

OTHER PUBLICATIONS

Chenxi, "Research and implementation of large-scale real-time face retrieval system and task scheduling algorithm", *Beijing University of Posts and Telecommunications*, 2019, 83 pages (English Abstract).

Office Action issued in corresponding Chinese Application No. 2019108088032, dated May 5, 2023.

Yan, et al. "Distributed image search in camera sensor networks", *Department of Computer Science*, 2008, 14 pages.

* cited by examiner

NETWORK CAMERA, VIDEO MONITORING SYSTEM AND METHOD

The present application is a national phase application under 35 U.S.C. § 371 of International Application No. PCT/CN2020/109328 filed Aug. 14, 2020, which claims the priority of a Chinese patent application No. 201910808803.2, filed with the China National Intellectual Property Administration on Aug. 29, 2019, and entitled "Network Camera, Video Monitoring System and Method", which are incorporated herein by reference in their entirety.

TECHNICAL FIELD

The present application relates to the technical field of video monitoring, in particular to a network camera, a video monitoring system and method.

BACKGROUND

Face images are acquired by a network camera of a video monitoring system and sent to a back-end server, and face comparison is performed by the back-end server. However, in the market, great hardware and software differences in different types of network cameras, and great hardware and software differences in many back-end servers cause problems that face comparison of the face images acquired by the network cameras cannot be performed successfully on some back-end servers, or the accuracy of comparison result is low.

SUMMARY

A first aspect of the present application provides a network camera including an image sensor, a processor, a memory and a network communication interface; the memory includes a first storage unit and a second storage unit; the image sensor is configured for acquiring images of monitoring scenes; the first storage unit is configured for storing all images acquired by the image sensor, the second storage unit is configured for storing a part of the images acquired by the image sensor, the part of the images is a subset of all images; the processor is configured for: matching a current image acquired by the image sensor with an image stored in the second storage unit to obtain a similarity value representing a matching result, and comparing the similarity value with a first similarity threshold indicated externally and a second similarity threshold indicated externally; when the similarity value is less than the first similarity threshold but greater than the second similarity threshold, sending the current image to a server with a matching failure message through the network communication interface; when the similarity value is less than the first similarity threshold and less than the second similarity threshold, sending the current image to the server with the matching failure message through the network communication interface, assigning a uniquely associated device target identifier to the current image, and storing the current image in the second storage unit; wherein the first similarity threshold is greater than the second similarity threshold, and the device target identifier for the current image is generated based on a time when the current image is stored in the second storage unit, a flag number of the network camera and a random value.

A second aspect of the application provides a video monitoring system including at least one network camera and a server, a communication connection between each camera and the server is established through a network; for any network camera in the at least one network device, the network camera includes an image sensor, a first processor, a first memory and a first network communication interface, wherein the first memory includes a first storage unit and a second storage unit; the image sensor is configured for acquiring images of monitored scenes; the first storage unit is configured for storing all images acquired by the image sensor, the second storage unit is configured for storing a part of the images acquired by the image sensor, the part of the images is a subset of all images; the first processor is configured for: matching a current image acquired by the image sensor with an image stored in the second storage unit to obtain a similarity value representing a matching result, and comparing the similarity value with a first similarity threshold indicated externally and a second similarity threshold indicated externally, when the similarity value is less than the first similarity threshold but greater than the second similarity threshold, sending the current image to the server with a matching failure message through the first network communication interface, and when the similarity value is less than the first similarity threshold and less than the second similarity threshold, sending the current image to the server with the matching failure message through the network communication interface, assigning a uniquely associated device target identifier to the current image, and storing the current image in the second storage unit, wherein the first similarity threshold is greater than the second similarity threshold, and the device target identifier is generated based on a time when the current image is stored in the second storage unit, a flag number of the network camera and a random value; wherein the server includes a second network communication interface, a second processor and a second memory; the second processor is configured for receiving the matching failure message sent by the network camera through the second network communication interface, judging whether there is an image in the second memory whose device target identifier is consistent with the device target identifier for the current image, if there is no image in the second memory whose device target identifier is consistent with the device target identifier for the current image, assigning a uniquely associated platform target identifier to the current image, establishing a correspondence between the device target identifier and the matching failure message, and storing the platform target identifier and the correspondence; if there is an image in the second memory whose device target identifier is consistent with the device target identifier for the current image, obtaining a platform target identifier for the matching image corresponding to the current image in the second memory, establishing a mapping relationship between the device target identifier and the platform target identifier, and storing the mapping relationship in the second memory.

A third aspect of the application provides a method for updating a face database in a camera including: acquiring a captured face image in response to a face capture instruction; matching the captured face image with any face image in the face database stored locally by the camera according to the face database, and calculating a similarity value of the captured face image; wherein, at least two face images are stored in the face database, and each face image uniquely corresponds to an identification number; wherein the identification number is used to indicate a time when the face image corresponding to the identification number is stored in the face database; and the identification number corresponds to a frequency value that is used to indicate the number of successful matches for the face image corresponding to the identification number; when the similarity value of the captured face image is greater than a first threshold, determining a successful match, and obtaining a face image with the highest similarity value to the captured face image in the face database, a first identification number corresponding to the face image and a frequency value corresponding to the first identification number; when the frequency value corresponding to the first identification number is less than a preset threshold, deleting the face image corresponding to the first identification number in the face database in the camera and updating the face database in the camera.

A fourth aspect of the application provides a method for associating a face database in a camera with a face database in a server, including: the camera acquires a captured face image in response to a face capture instruction; the camera matches the captured face image with any face image in the face database stored locally by the camera according to the face database and calculates a similarity value of the captured face image; wherein, at least two face images are stored in the face database, and each captured face image uniquely corresponds to an identification number; wherein, the identification number is used to indicate a time when a face image corresponding to the identification number is stored in the face database in the camera; and the identification number corresponds to a frequency value that is used to indicate the number of successful matches for the face image corresponding to the identification number; when the similarity value of the captured face image is greater than a first threshold, the camera determines a successful match, and obtains a face image with the highest similarity value to the captured face image in the face database and a first identification number corresponding to the face image; and sending the first identification number and the captured face image to the server; according to the received first identification number, the server compares the captured face image with the face database in the server in response to the first identification number being received for the first time, wherein each face image in the face database in the server uniquely corresponds to a second identification number; after the captured face image is successfully compared with the face image in the server, the server obtains a face image in the server with the highest similarity value to the captured face image and the corresponding second identification number; the server creates an association relationship between the first identification number and the second identification number, and the association relationship is used to associate the face database in the camera with the face database in the server.

In the embodiments of present application, the images acquired by the network camera are processed by its own processor, and the acquired images are stored in a targeted manner according to the processed results, which not only reduces the difficulty of image comparison, but also improves the accuracy of comparison results, furthermore, the network camera sends the processed results of the image to the server without the image comparison performed by the server, thus solving the problems that the face images acquired by the network camera cannot be successfully compared on some back-end servers or the accuracy of comparison results is low.

BRIEF DESCRIPTION OF THE DRAWINGS

In order to explain the technical solution of the embodiments of the present application and the prior art more clearly, drawings used in the embodiments and the prior art will be briefly described below. Obviously, the drawings in the following description are for only some embodiments of the present application, and other drawings could be obtained according to these drawings without any creative efforts for those skilled in the art.

DETAILED DESCRIPTION

In order to make the purpose, technical solution and advantages of the application clearer, the application will be further described in detail with reference to the drawings and embodiments. It is obviously that the described embodiments are only some of the embodiments of the present application instead of all of them. Based on the embodiments in the present application, all other embodiments obtained by those skilled in the art without any creative efforts are within the protection scope of the present application. The technical solution of the present application will be described in detail with the following specific embodiments. The following embodiments could be combined with each other, and they can refer to each other for the same and similar concepts or processes.

Figure 1:
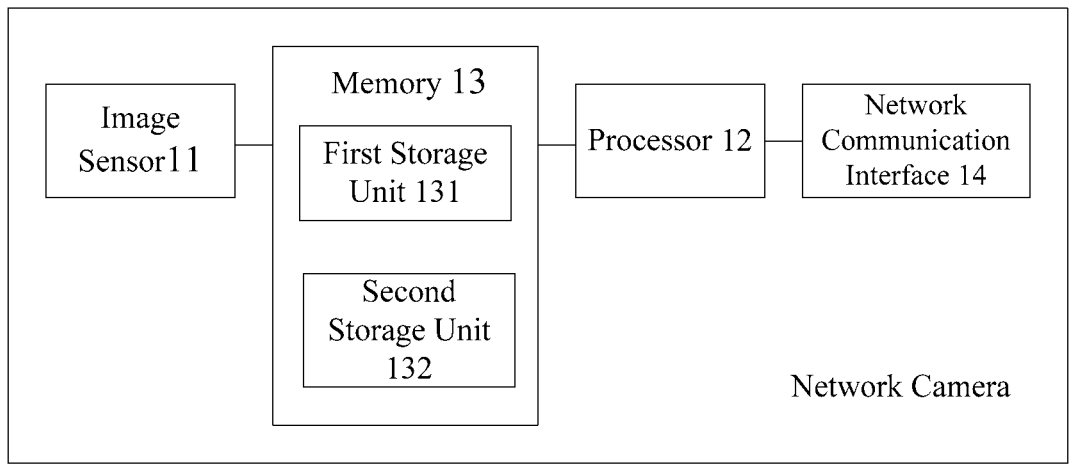
FIG. 1 is a schematic structural diagram of a network camera according to an embodiment of the present application.

FIG. 1 is a schematic structural diagram of a network camera according to an embodiment of the present application. As shown in FIG. 1, the network camera according to the embodiment of the present application may include an image sensor 11, a processor 12, a memory 13 and a network communication interface 14. The memory 13 includes a first storage unit 131 and a second storage unit 132.

In the embodiment of the present application, the image sensor 11 is configured for acquiring images of a monitored scene.

The first storage unit 131 is configured for storing all images acquired by the image sensor 11, and the second storage unit 132 is configured for storing a part of the images acquired by the image sensor 11, the part of the images is a subset of all images described above.

The processor 12 is configured for matching a current image acquired by the image sensor 11 with images stored in the second storage unit 132 to obtain a similarity value representing a matching result, and comparing the similarity value with a first similarity threshold indicated externally and a second similarity threshold indicated externally, when the similarity value is less than the first similarity threshold but greater than the second similarity threshold, sending the current image to a server with a matching failure message through the network communication interface 14, and when the similarity value is less than the first similarity threshold and less than the second similarity threshold, sending the current image to the server with a matching failure message through the network communication interface 14, and assigning a uniquely associated device target identifier to the current image, and storing the current image in the second storage unit 132.

The first similarity threshold is greater than the second similarity threshold, and the device target identifier for the current image is generated based on a time when the current image is stored in the second storage unit 132, a flag number of the network camera and a random value.

The first similarity threshold and the second similarity threshold indicated externally refer to a preset first similarity threshold and a preset second similarity threshold. Of course, the first similarity threshold and the second similarity threshold may also be adjusted according to an instruction input by the user. Those skilled in the art may understand that the first storage unit 131 cannot store images indefinitely due to the capacity limitation of the first storage unit 131. In the embodiment of the present application, the first storage unit 131 is configured for storing all images acquired by the image sensor 11, which means that all images acquired by the image sensor 11 will be sent to the first storage unit 131 for storage, and after the first storage unit 131 is full, the earliest stored image may be overwritten or the first storage unit 131 may be replaced with a new one, and so on.

Optionally, the matching failure message and a matching success message described below may be uploaded through fields of different protocols, so that the server may distinguish matching results when the network camera performs upload.

For example, a specified field may be set in a header of a message to distinguish the matching results. The specified field in the matching failure message is a first character (for example, 0), and the specified field in the matching success message is a second character (for example, 1). The matching results may be distinguished by identifying the character in the specified field.

Optionally, in the embodiment, by the image sensor 11, the network camera acquires images of the monitored scene in which the network camera is located, for example, when a lens of the network camera is just focused on a face, the current image containing the face is captured by the image sensor 11. On the one hand, the image sensor 11 transmits the current image to the first storage unit 131 for storage; on the other hand, the processor 12 matches the current image with images stored in the second storage unit 132 by analyzing the face features in the current image and the face features of the image stored in the second storage unit 132 with a face detection technology to obtain a matching result, which includes a similarity value between the current image and the stored image.

The similarity value between the current image and the stored image may include all similarity values between the current image and all images stored in the second storage unit 132, or the similarity value between the current image and the stored image may be a maximum similarity value among all similarity values, which is not limited by the embodiment of the present application and may be customized according to an actual situation.

As an example, the processor 12 first matches the similarity value with the first similarity threshold indicated externally, and determines a matching result. The first similarity threshold is used to judge whether the current image is successfully matched with an image in all images in the second storage unit 132.

In the embodiment, if the similarity value between the current image and each of the images stored in the second storage unit 132 is less than the first similarity threshold, it indicates that there is no image in the second storage unit 132 whose content is consistent with content of the current image (the content in the present application refers to a concerned object, such as a face, a human body or a vehicle, etc.), further, in order to ensure the synchronization between the network camera and the image stored in the server (i.e., the back-end server in the video monitoring system), on the one hand, the current image may be sent to the server with a matching failure message through the network communication interface 14, the matching failure message is used to indicate that the current image fails to match in the network camera, that is, there is no image whose content is consistent with the content of current image, among the images previously captured by the network camera, so that the server may perform corresponding processing.

On the other hand, in order to ensure the uniqueness of the images stored in the second storage unit 132, the processor 12 may also match the similarity value with the second similarity threshold indicated externally, to judge whether the current image meets a condition of being stored in the second storage unit 132. The second similarity threshold is used to judge whether to store the current image in the second storage unit 132. In the embodiment, the first similarity threshold is greater than the second similarity threshold, that is, when the matching result is that the matching is successful, the operation of storing the current image in the second storage unit 132 will not be performed, so it is unnecessary to judge whether to store the current image in the second storage unit 132, which reduces the amount of calculations.

Before the current image is stored in the second storage unit 132, a uniquely associated device target identifier may be assigned to the current image, the device target identifier may be generated according to the time when the current image is stored in the second storage unit 132, the flag number of the network camera and the random value, in this way, not only the generated device target identifier is ensured to be unique, but also the time when the current image was taken and the current image was taken by which network camera may also identified.

In the embodiment, the device target identifier for the image may be an unique identifier representing that the image is inside a device, which may use 64-bit characters, and a specific composition of the device target identifier may be: device serial number+storage time+random number. The application does not limit the specific composition of device target identifier, which may be determined according to the actual situation.

Figure 2:
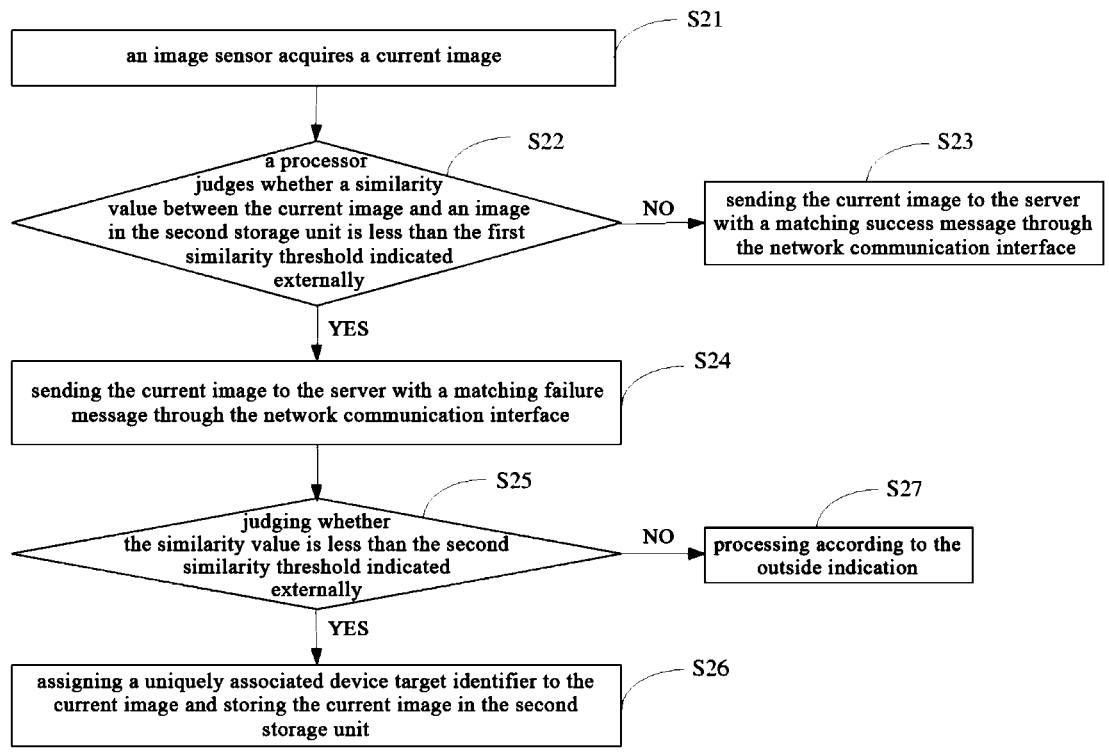
FIG. 2 is a schematic flow chart of the network camera in the embodiment shown in FIG. 1 storing captured images in a second storage unit.

Exemplarily, FIG. 2 is a schematic flow chart of the network camera in the embodiment shown in FIG. 1 storing captured images in a second storage unit. As shown in FIG. 2, the image storage process includes the following steps: S21, an image sensor acquires a current image. S22, a processor judges whether a similarity value between the current image and an image in the second storage unit is less than the first similarity threshold indicated externally, if the similarity value between the current image and the image in the second storage unit is not less than the first similarity threshold indicated externally, executes S23 to send the current image to the server with a matching success message through the network communication interface; if the similarity value between the current image and the image in the second storage unit is less than the first similarity threshold indicated externally, executes S24 to send the current image to the server with a matching failure message through the network communication interface and S25 judges whether the similarity value is less than the second similarity threshold indicated externally; if the similarity value is less than the second similarity threshold indicated externally, executes S26 to assign a uniquely associated device target identifier to the current image and stores the current image in the second storage unit; if the similarity value is not less than the second similarity threshold indicated externally, executes S27 to process the image according to the external indication.

In S22, the similarity value between the current image and the image in the second storage unit may specifically be the maximum one of the similarity values between the current image and each image in the second storage unit. The embodiment of the present application does not limit the specific implementation principle of S27, which may be determined based on the actual situation.

In the embodiment of the present application, the network camera uses the image sensor to acquire the images of the monitored scene. On the one hand, the acquired images are stored in the first storage unit of the memory; on the other hand, the processor is configured for matching the current image acquired by the image sensor with images stored in the second storage unit of the memory, so as to obtain a similarity value representing the matching result, when the similarity value is less than the first similarity threshold but greater than the second similarity threshold indicated externally, sending the current image to the server with a matching failure message through the network communication interface; and when the similarity value is less than the first similarity threshold and less than the second similarity threshold, assigning a uniquely associated device target identifier to the current image while sending the current image to the server with a matching failure message through the network communication interface, and storing the current image in the second storage unit.

Exemplarily, in a possible design of the present embodiment, the above-mentioned processor 12 is specifically configured for acquiring image quality of the current image when determining that the similarity value is less than the first similarity threshold and less than the second similarity threshold, and when the image quality is greater than a preset image quality, sending the current image to the server with a matching failure message through the network communication interface 14, assigning a uniquely associated device target identifier to the current image, and storing the current image in the second storage unit 132.

In some cases, when the image quality is poor, images with different contents may be wrongly determined as the same image, therefore, in order to ensure the quality of the images stored in the second storage unit 132 and avoid errors in subsequent similarity determination, optionally, the processor 12 of the network camera may make quality determination before storing the current image in the second storage unit 132, and store the current image in the second storage unit 132 only when the image quality of the current image is greater than a preset image quality.

In the embodiment of the present application, the specific value of the preset image quality is not limited, which may be customized according to the actual situation, for example, the value be determined according to the size of the storage space of the second storage unit 132, the best quality of the image captured by the image sensor 11, etc., which will not be described in detail here.

In the embodiment of the present application, the quality of the image stored in the second storage unit can be improved by judging the image quality of the current image, and the accuracy of the result is higher when the image with high quality is used for similarity judgment, which lays a foundation for the subsequent accurate similarity judgment.

Furthermore, in an embodiment of the present application, the processor 12 is further configured for comparing the similarity value with a third similarity threshold indicated externally, acquiring the image quality of the current image when the similarity value is greater than the third similarity threshold, and if the image quality is greater than the image quality of a matching image corresponding to the current image, replacing the matching image in the second storage unit 132 with the current image and taking a device target identifier for the matching image as the device target identifier for the current image, wherein the third similarity threshold is greater than the first similarity threshold.

The third similarity threshold indicated externally refers to a preset third similarity threshold. Of course, the third similarity threshold may also be adjusted according to the instruction input by the user.

In the embodiment, for the first-time storing images, the processor 12 may store all images that meet the second similarity threshold and the preset image quality in the second storage unit 132. Over time, when the network camera is in a scene with good light, the image quality of the captured current image may be greater than the matching image initially stored in the second storage unit 132. At this time, if the similarity value between the current image and the matching image in the second storage unit 132 is greater than the third similarity threshold, the matching image in the second storage unit 132 may be replaced with the current image in order to ensure that the image matching result can be determined quickly and accurately.

Optionally, in order to ensure that the device target identifier for images uploaded to the server are consistent and avoid repeated processing by the server, the device target identifier for the matching image is taken as the device target identifier for the current image.

Optionally, the third similarity threshold should be greater than the first similarity threshold, for example, in the present embodiment, when the first similarity threshold is 85%, the third similarity threshold may be 88%, 90%, etc. The embodiment of the present application does not limit the specific values of the first similarity threshold and the third similarity threshold, only if the condition that the third similarity threshold is greater than the first similarity threshold is met.

In the network camera according to the embodiment of the present application, the images in the second storage unit has an update mechanism, which can further reduce the processing pressure of the network camera and improve the accuracy of image comparison results.

Optionally, in another possible design of the present application, the processor 12 is further configured for determining a current storage amount of the second storage unit 132 and a first ratio of images in the second storage unit 132, and adjusting the second similarity threshold based on the current storage amount, the first ratio and a upper limit value for image storage of the second storage unit 132 indicated externally, the first ratio is used to indicate a ratio of the number of target objects corresponding to the current storage amount to the current storage amount.

In the embodiment, both the first similarity threshold and the second similarity threshold may be customized values, the second similarity threshold may be associated with the storage amount of the second storage unit 132. Specifically, the processor 12 may dynamically adjust the second similarity threshold based on the storage amount of the second storage unit 132, the first ratio of images in the second storage unit 132 and the upper limit value for image storage of the second storage unit 132 indicated externally, so that the number of the images stored in the second storage unit 132 does not exceed the storage upper limit value.

The first ratio of images may also be characterized by the repetition rate of image storage and accuracy of images, etc., a high first ratio indicates that the accuracy of storage is high, but the repetition rate of storage is low. Specifically, the first ratio represents a ratio of the total number of images with different targets to the total number of images stored in the second storage unit 132. For example, a total of 100 images of persons are stored in the second storage unit 132, but the 100 images actually only correspond to 90 different persons, so the first ratio is 90%, that is, the repetition rate of the images stored in the second storage unit 132 is 10%. The upper limit value for image storage of the second storage unit 132 indicated externally may specifically be the number of different targets stored in the second storage unit 132. Optionally, the larger the storage amount of the second storage unit 132 is, the higher the second similarity threshold is; the higher the first ratio of the images in the second storage unit 132 is, the higher the second similarity threshold is; and the higher the upper limit value for the image storage of the second storage unit 132 indicated externally is, the higher the second similarity threshold is.

Optionally, in the embodiment, the processor 12 is further configured for replacing an image with the lowest number of successful matches in the second storage unit with the current image when the current storage amount is equal to the upper limit value for image storage.

When the current image needs to be stored in the second storage unit 132, but the second storage unit 132 is full, the image with the lowest number of successful matches may be determined by analyzing the number of successful matches for each image in the second storage unit 132, the image with the lowest number of successful matches may be an image that was mistakenly stored in the second storage unit 132, or the target corresponding to the image does not often appear in the area monitored by the network camera. Therefore, when the current storage amount of the second storage unit 132 is equal to the upper limit value for image storage, the image with the lowest number of successful matches in the second storage unit 132 may be replaced with the current image in order to ensure that the current image can be stored in time.

Exemplarily, in another possible implementation of the embodiment, the processor 12 is further configured for when the similarity value is greater than or equal to the first similarity threshold, determining a current time as a current successful matching time, and judging whether a time difference between the current successful matching time and the latest successful matching time is greater than or equal to a preset time difference; if the time difference between the current successful matching time and the latest successful matching time is greater than or equal to the preset time difference, sending the current image to the server with a matching success message through the network communication interface 14, updating the latest successful matching time to the current successful matching time and adding 1 to the number of successful matches for the matching image corresponding to the current image; and if the time difference between the current successful matching time and the latest successful matching time is less than the preset time difference, discarding the current image.

Optionally, in the embodiment of the present application, if the similarity value is greater than or equal to the first similarity threshold, it means that there is an image in the second storage unit 132 whose content is consistent with content of the current image. At this time, in order to avoid repeated uploading of content, whether the time difference between the current successful matching time of a target matching image and the latest successful matching time of the target matching image meets a preset time relationship is determined, the target matching image is an image in the second storage unit 132 with the largest similarity value to the current image.

As an example, if the time difference between the current successful matching time of the target matching image and the latest successful matching time of the target matching image is greater than or equal to the preset time difference, it indicates that the image sensor 11 has not repeatedly sampled within the preset time period. At this time, on the one hand, the processor 12 may upload the current image to the server, specifically by sending the current image to the server through the network communication interface 14 with the matching success message. The matching success message is used to indicate that the current image is successfully matched in the network camera, that is, there is a consistent image in the images previously captured by the network camera, which can indicate that the current image has been uploaded previously by the network camera; on the other hand, in the network camera, the processor 12 may also increase the number of successful matches for the matching image corresponding to the current image by one in the second storage unit 132, so as to count the number of successful matches for the matching image in the second storage unit 132. The matching image corresponding to the current image refers to a matching image which is successfully matched with the current image, the more the number of successful matches for the matching image corresponding to the current image is, the more it can indicate that the content of the current image is frequently acquired.

As another example, if the time difference between the current successful matching time and the latest successful matching time is less than the preset time difference, it indicates that the image sensor 11 repeatedly sampled within the preset time period. At this time, the current image may not be processed or directly discarded.

The specific value of the preset time difference and its accuracy may be determined according to the actual situation, exemplarily, in the embodiment, the preset time difference may be 5s, 8s, 10s, and the accuracy of the preset time difference may be 0.1s, etc.

Figures 3, 4:
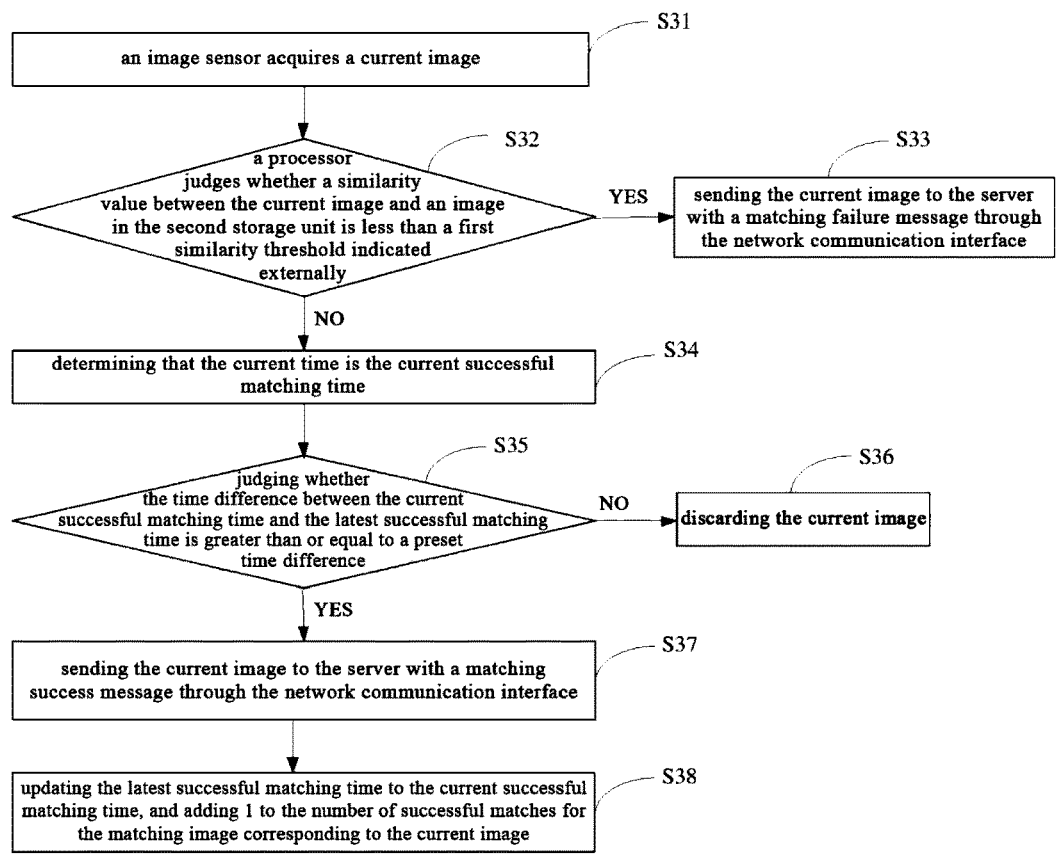
FIG. 3 is a schematic diagram of an implementation of the network camera in the embodiment shown in FIG. 1 uploading the captured images to a server.
FIG. 4 is an interface diagram of attribute setting of the second storage unit.

Exemplarily, FIG. 3 is a schematic diagram of an implementation of the network camera in the embodiment shown in FIG. 1 uploading the captured images to a server. As shown in FIG. 3, the implementation may include the following steps: S31, an image sensor acquires a current image; S32, a processor judges whether a similarity value between the current image and an image in the second storage unit is less than a first similarity threshold indicated externally, if the similarity value between the current image and the image in the second storage unit is less than the first similarity threshold indicated externally, executes S33 to send the current image to the server with a matching failure message through the network communication interface; if the similarity value between the current image and the image in the second storage unit is greater than or equal to the first similarity threshold indicated externally, executes S34 to determine that the current time is the current successful matching time and executes S35 to judge whether the time difference between the current successful matching time and the latest successful matching time is greater than or equal to a preset time difference, if the time difference between the current successful matching time and the latest successful matching time is less than the preset time difference, executes S36 to discard the current image; if the time difference between the current successful matching time and the latest successful matching time is greater than or equal to the preset time difference, executes S37 to send the current image to the server with a matching success message through the network communication interface and S38 to update the latest successful matching time to the current successful matching time, and adds 1 to the number of successful matches for the matching image corresponding to the current image.

In S32, the similarity value between the current image and the image in the second storage unit may specifically be the maximum similarity value between the current image and each image in the second storage unit.

In the embodiment, when the similarity value is greater than or equal to the first similarity threshold, repeated uploading of images to the server can be avoided by comparing the time difference between the current successful matching time and the latest successful matching time with the preset time difference, thereby reducing the processing burden of the server, and improving the stability of the video monitoring system.

Optionally, on the basis of the embodiment, the processor 12 is further configured for periodically obtaining the number of successful matches for each image in the second storage unit 132 within a preset time period, retaining images whose number of successful matches is greater than or equal to a threshold number of successful matches indicated externally, and deleting images whose number of successful matches is less than the threshold number of successful matches indicated externally.

The threshold number of successful matches indicated externally may be a preset value or a value set by the user. The threshold number of successful matches indicated externally is positively correlated with a preset time period, for example, when the preset time period is 1 day, the threshold number of successful matches may be 1, 2 or 3 times, etc.; when the preset time period is 1 week, the threshold number of successful matches may be 5, 10 or 20 times.

In the embodiment, the network camera also has the function of regularly deleting images in the second storage unit 132, so as to ensure that the images stored in the second storage unit 132 are frequently used, thus increasing the use frequency of the images stored in the second storage unit 132.

Specifically, functions such as adding, deleting image, and setting attribute for the second storage unit 132 is completely compatible with the management of the storage unit under normal circumstances, the second storage unit may receive attribute values specified by users through a human-computer interaction interface.

For example, FIG. 4 is an interface diagram of attribute setting of the second storage unit. As shown in FIG. 4, in the embodiment, the information of the second storage unit may specifically be as follows:

name: second storage unit 1, first similarity threshold (i.e., successful matching threshold): 85%, remark information: none;

image storage settings:

enabling storing: disenabled (block unchecked indicates disenabled, block checked indicates enabled), second similarity threshold (i.e. similarity threshold of storing): 70%, image quality threshold: 60%;

clear settings:

judgment period: days, period for counting statistics: 2 months, minimum number of successful matches: 2.

The embodiment of the present application does not limit the specific values of the above parameters, which may be set according to requirements, and the above is only an example.

Figures 5, 6:
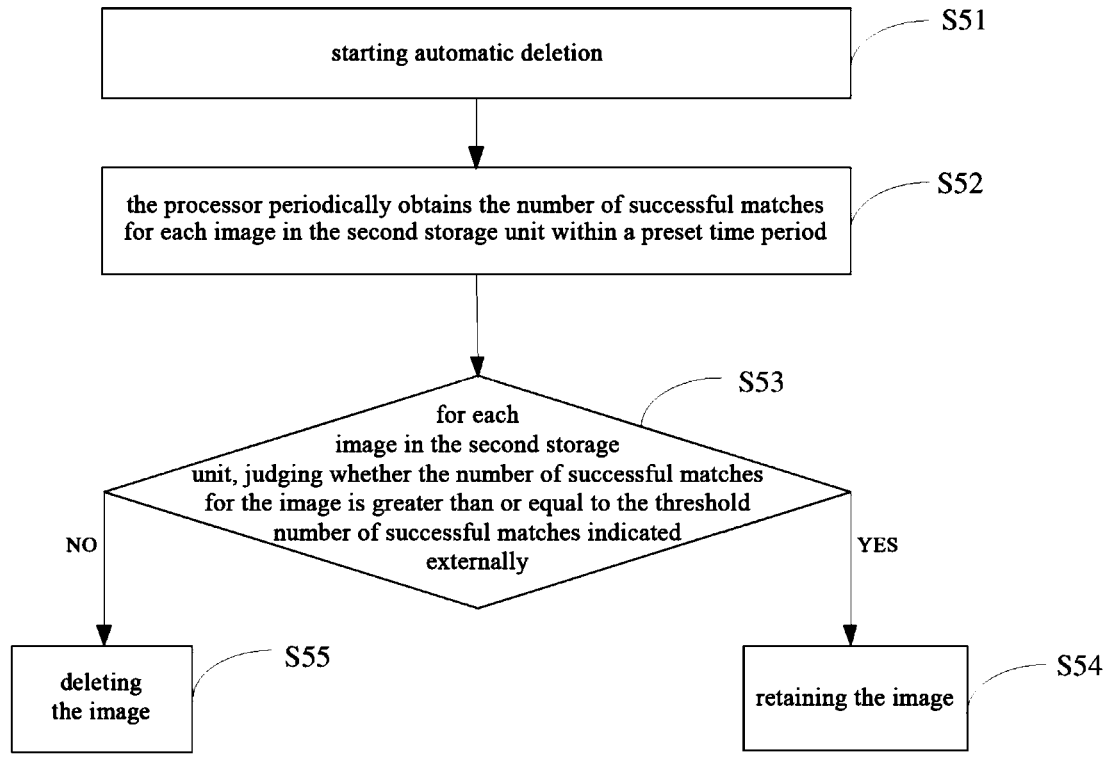
FIG. 5 is a schematic diagram of an implementation of deleting an image in the second storage unit.
FIG. 6 is a schematic diagram of detailed information of a target image in the second storage unit displayed by a display device.

Exemplarily, FIG. 5 is a schematic diagram of an implementation of deleting an image in the second storage unit. As shown in FIG. 5, the implementation may include the following steps: S51, automatic deletion is started; S52, the processor periodically obtains the number of successful matches for each image in the second storage unit within a preset time period, S53, for each image in the second storage unit, judges whether the number of successful matches for the image is greater than or equal to the threshold number of successful matches indicated externally; if the number of successful matches for the image is greater than or equal to the threshold number of successful matches indicated externally, executes S54 to retain the image; if the number of successful matches for the image is less than the threshold number of successful matches indicated externally, executes S55 to delete the image.

In the embodiment, by regularly deleting images in the second storage unit whose number of successful matches is less than the threshold number of successful matches indicated externally, enough space in the second storage unit to store newly added images can be ensured, thereby reducing the abnormal situation caused by the second storage unit being full, improving the automation capability of the network camera and improving the device competitiveness.

Exemplarily, in another possible design of the embodiment of the present application, the processor 12 is further configured for sorting the images in the second storage unit 132 according to an image sorting instruction indicated externally in response to the image sorting instruction, to obtain a sorting result, the image sorting instruction is used to indicate a sorting mode for the images in the second storage unit 132, and the sorting mode may be based on parameters such as number of successful matches, successful matching time, storage time, etc., and the images may be sorted in ascending or descending order according to the size of the parameters thereof.

In the embodiment, the processor 12 may sort the images in the second storage unit 132 based on the image sorting instruction indicated externally to obtain a sorting result, so that the processor 12 can transmit the sorting result to a display device connected with the network camera, so that the display device presents the sorting result.

Exemplarily, the display device may have a human-computer interaction interface, which can be controlled by a user, that is, the user may input or generate an image sorting instruction through the human-computer interaction interface, so as to indicate in what sorting mode the images in the second storage unit 132 may be displayed.

Exemplarily, since the device target identifier for each image in the second storage unit 132 is generated by the time when the image is stored in the second storage unit 132, the flag number of the network camera and a random value, and the processor 12 records the information such as the number of successful matches for each image and a successful matching time each time, the network camera can at least provide any one of the parameters such as the number of successful matches, a successful matching time, a storage time for sorting the images.

Exemplarily, in the embodiment, the processor 12 is further configured for, in response to a display instruction issued externally for a target image, obtaining a plurality of similar images having a similarity greater than the first similarity threshold with a target image from the first storage unit 131 based on the display instruction, so as to display the target image and the plurality of similar images.

In the embodiment, the processor 12 may store all images captured by the image sensor 11, since the images stored in the second storage unit 132 are a subset of the images stored in the first storage unit 131, specifically, the first storage unit 131 stores all captured images, and the second storage unit 132 stores images that meet the second similarity threshold among all images, therefore, images in the first storage unit 131 have a certain correspondence with images in the second storage unit 132. For example, an images in the first storage unit 131 may carry an identifier of matching image that is an image in the second storage unit 132, and have a successful matching time, therefore, when the user sends the display instruction, the processor 12 may obtain a preset number of similar images from the first storage space based on the identifier of the target image in the display instruction and the above correspondence in response to the display instruction, so as to display the target image and multiple similar images.

Exemplarily, the network camera may be connected to a display device, so that the display device may display images in the first storage unit and/or the second storage unit in the network camera.

Optionally, the display device has a human-computer interaction interface, so that when the human-computer interaction interface of the display device displays the image in the second storage unit 132, the user may click on an image in the second storage unit 132 through the human-computer interaction interface, and the detailed information of the image may be displayed on the human-computer interaction interface. FIG. 6 is a schematic diagram showing detailed information of a target image in the second storage unit displayed by a display device. As shown in FIG. 6, the human-computer interaction interface of the display device may include function options such as preview, recycle (i.e., deletion), picture, application, configuration, etc. For example, for the application option, there are filtering conditions on the display interface for the second storage unit, and for a selected image, the human-computer interaction interface may also display detailed information of the image, i.e., image details. For example, image attributes may include information such as the name, gender, province, and city of the person corresponding to the image, second similarity threshold, storage time, total number of successful matches, etc., and shooting records may include matching time, acquaintance, image quality, etc.

Figure 7:
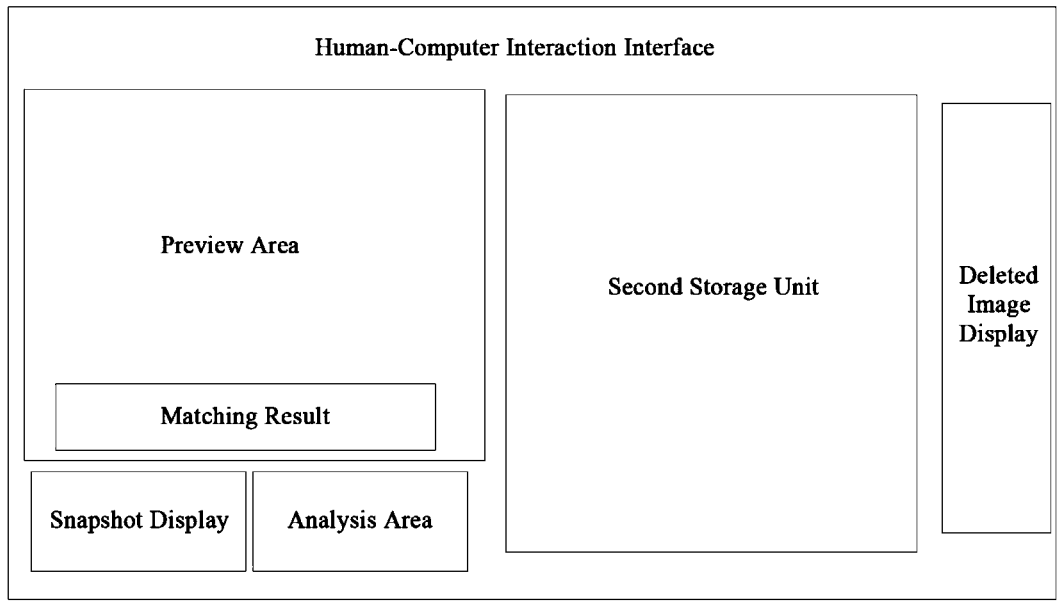
FIG. 7 is a schematic design diagram of a human-computer interaction interface of a display device.

Exemplarily, FIG. 7 is a schematic design diagram of a human-computer interaction interface of a display device. As shown in FIG. 7, in the embodiment, the human-computer interaction interface may be divided into a plurality of areas, such as a preview area, a matching result, a snapshot display, an analysis area, a second storage unit, a deleted image display, etc. The specific distribution of each area is shown in FIG. 7 and will not be repeated here.

The network camera according to the embodiment may process the images captured in the monitored scene where the network camera located, automatically maintain the images in the second storage unit, thereby reducing the process of repeated processing, improving the automation degree of the network camera and the accuracy of image comparison results. Further, the network camera may assign a uniquely associated device target identifier to each generated image, and images transmitted to the server also carry the device target identifier, in this way, accurate image comparison results can be obtained without image matching by the server.

Figure 8:
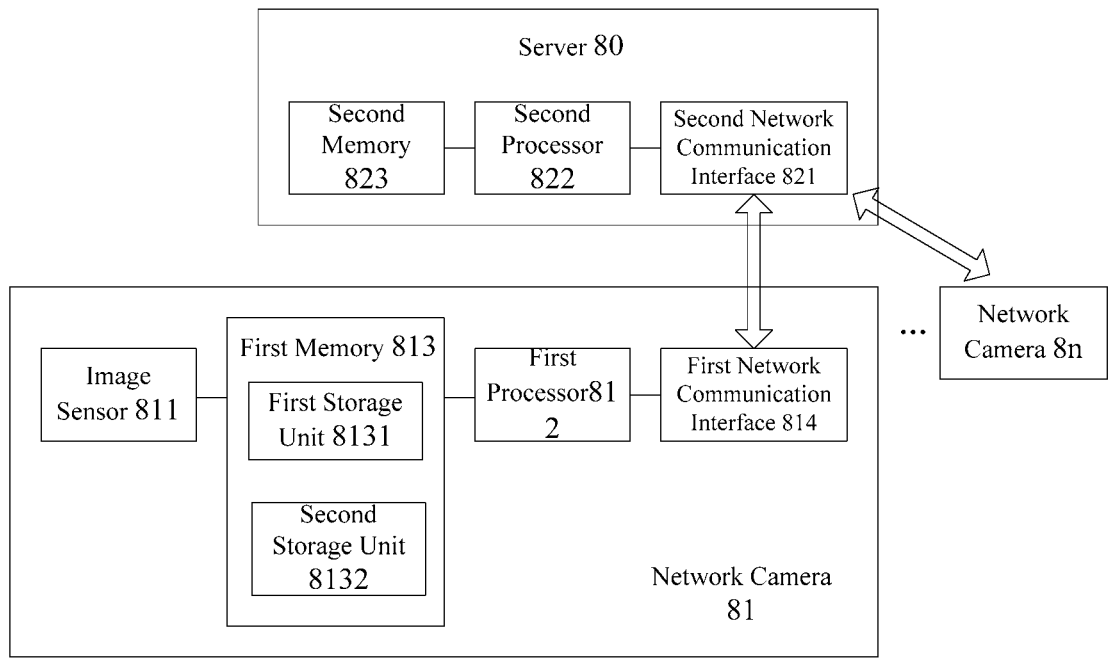
FIG. 8 is a schematic structural diagram of a video monitoring system according to an embodiment of the present application.

Furthermore, the present application further provides a video monitoring system. FIG. 8 is a schematic structural diagram of a video monitoring system according to an embodiment of the present application. As shown in FIG. 8, the video monitoring system may include at least one network camera (for example, network camera 81 to network camera 8n, where n is a positive integer) and a server 80, and a communication connection between each network camera and the server 80 is established through a network.

Each of the at least one network camera may have the same configuration, and the implementation principle of each network camera is similar. In the present embodiment, an explanation is made to a network camera 81 of the at least one network camera.

As shown in FIG. 8, the network camera 81 includes an image sensor 811, a first processor 812, a first memory 813 and a first network communication interface 814. the first memory 813 includes a first storage unit 8131 and a second storage unit 8132.

The image sensor 811 is configured for acquiring images of the monitored scene.

The first storage unit 8131 is configured for storing all images acquired by the image sensor 811, and the second storage unit 8132 is configured for storing part of the images that is a subset of all images, acquired by the image sensor 811.

The first processor 812 is configured for:
matching a current image acquired by the image sensor 811 with an image stored in the second storage unit 8132 to obtain a similarity value representing a matching result; comparing the similarity value with a first similarity threshold indicated externally and a second similarity threshold indicated externally; when the similarity value is less than the first similarity threshold but greater than the second similarity threshold, sending the current image to a server 80 with a matching failure message through the first network communication interface 814; and when the similarity value is less than the first similarity threshold and less than the second similarity threshold, sending the current image to the server 80 with a matching failure message through the first network communication interface 814; and assigning a uniquely associated device target identifier to the current image, and storing the current image in the second storage unit 8132.

The first similarity threshold is greater than the second similarity threshold, and the device target identifier for the current image is generated based on a time when the current image is stored in the second storage unit 8132, a flag number of the network camera 81 and a random value.

With regard to the specific composition and the specific implementation principles of each component of the network camera 81 and other network cameras, a reference may be made to the illustration shown in the FIGS. 1 to 7, and will not be repeated here.

As shown in FIG. 8, the server 80 includes a second network communication interface 821, a second processor 822 and a second memory 823.

The second processor 822 is configured for receiving the matching failure message sent by the network camera through the second network communication interface 821, judging whether there is an image in the second memory 823 whose target identifier is consistent with the target identifier for the current image, if there is no image in the second memory whose target identifier is consistent with the target identifier for the current image, assigning a uniquely associated platform target identifier to the current image, and establishing a correspondence between the device target identifier and the matching failure message, and storing the platform target identifier and the correspondence; if there is an image in the second memory whose target identifier is consistent with the target identifier for the current image, obtaining a platform target identifier for the current image in the second memory 823, establishing a mapping relationship between the device target identifier and the platform target identifier, and storing the current image and the mapping relationship in the second memory 823.

In the present embodiment, the server 80 may receive images sent by a plurality of network cameras through the second network communication interface 821, and in the present embodiment, the reception of the image sent by the network camera 81 will be explained as an example.

Exemplarily, when the first processor 812 of the network camera 81 sends the current image captured by the image sensor 811 to the server 80 with a matching failure message through the first network communication interface 814, correspondingly, the server 80 may receive the current image through the second network communication interface 821.

In the present embodiment, since the current image received by the server 80 is sent with a matching failure message, the second processor 822 of the server 80 may determine that the network camera may not have sent a matching image for the current image before, but in order to avoid missing record of the matching image for the current image, the second processor 822 may perform similarity matching on the current image, and judge whether a matching image for the current image is stored in the server 80, that is, judge whether there is an image in the second memory 823 whose device target identifier is consistent with the device target identifier for the current image, and execute corresponding processing according to the judgment result.

As an example, if there is no image in the second memory 823 whose device target identifier is consistent with the device target identifier for the current image, a correspondence between the device target identifier and the matching failure message is established to record that the content of the current image is not recorded in the server 80, so as to make a mark, so that relevant personnel can deal with it later.

As another example, if there is an image in the second memory 823 whose device target identifier is consistent with the device target identifier for the current image, a platform target identifier for the matching image corresponding to the current image in the second memory 823 is obtained, a mapping relationship between the device target identifier and the platform target identifier is established, and the mapping relationship is stored in the second memory 823.

In the present embodiment, although the matching image for the current image exists in the second memory 823, a correspondence between the matching image and the current image is not recorded, therefore, the second processor 822 may obtain the platform target identifier in the second memory 823 for the matching image, establish and store a mapping relationship between the device target identifier for the current image and the platform target identifier for the current image, so that when the network camera uploads the matching image for the current image again, the mapping relationship between the device target identifier for the current image and the platform target identifier for the current image may be directly obtained, so as to be directly mapped to the previous analysis result, thus decreasing the computational power occupation of the server 80 and reducing the processing burden of the server 80.

Optionally, the platform target identifier in the present embodiment may be the detailed information of the content of the image in the server, for example, the actual identity information of the person corresponding to the face in the face image, e.g., may be identity information such as ID or name. The application does not limit the content of the platform target identifier, which may be set according to actual requirements.

Exemplarily, in a possible design of the present application, if the first processor 812 is further configured for sending the current image to the server 80 with a matching success message through the first network communication interface 814 when the similarity value is greater than or equal to the first similarity threshold.

Correspondingly, the second processor 822 is further configured for receiving the matching success message sent by the network camera through the second network communication interface 821, obtaining the platform target identifier in the second memory 823 for the matching image corresponding to the current image, and taking the analysis result of the platform target identifier as the analysis result of the current image.

In the present embodiment, if the current image received by the server 80 is sent with the matching success message, the second processor 822 of the server 80 may determine that the matching image for the current image may have been sent by the network camera before, and directly obtain the platform target identifier in the second memory 823 for the matching image corresponding to the current image, and take the analysis result of the platform target identifier as the analysis result of the current image, without analyzing the current image again, thereby decreasing the computational power occupation of the server 80 and the processing tasks of the server 80 and reducing the processing burden of the server 80.

Furthermore, based on the embodiment, the second processor 822 is further configured for sending the platform target identifier for the current image to the network camera through the second network communication interface 821.

Correspondingly, the first processor 812 is further configured for receiving the platform target identifier for the current image through the first network communication interface 814, and when the similarity value between the image captured by the image sensor 811 and the images stored in the second storage unit 8132 is greater than or equal to the first similarity threshold, sending the platform target identifier as the device target identifier for the image to the server 80;

Correspondingly, the second processor 822 is further configured for directly obtaining the analysis result of the received image according to the platform target identifier for the image.

In the present embodiment, when the first processor 812 uploads the current image with the matching success message, it is indicates that the matching image for the current image is stored in the second storage unit 8132 of the network camera, at this time, the second processor 822 may send the obtained platform target identifier for the current image to the network camera.

After receiving the platform target identifier, on the one hand, the network camera may directly use the platform target identifier as the device target identifier for the matching image corresponding to the current image, in this way, when the network camera uploads the successfully matched image once again, the network camera may send the platform target identifier as the device target identifier to the server 80, so that the second processor 822 of the server 80 can directly obtain the analysis result of the image according to the platform target identifier, without obtaining the platform target identifier having a mapping relationship with the device target identifier, thus reducing the workload of searching mapping relationship.

On the other hand, the network camera may retain the mapping relationship between the platform target identifier and the device target identifier, when matching a captured image successfully, the network camera may determine the platform target identifier and then upload the platform target identifier, which can also reduce the workload of searching mapping relationship for the server 80 and reduce the processing burden of the server 80.

In the video monitoring system according to the embodiment of the present application, the network camera may self-maintain the images in the second storage unit of the current point, form a point-specific second storage unit unique for the current point through long-term accumulation, and form a mapping relationship between the device target identifier for an image in one device and the platform target identifier for the image in the back-end large-scale memory at the back-end server. Once a subsequent received image is matched successfully, the server does not need to match again, instead, map directly the device target identifier for the successfully matched image in the network camera, which not only reduces the processing pressure, but also avoids the incompatibility between the front-end network camera and the server and the difficulty in maintaining the images in the second storage unit.

Figure 9:
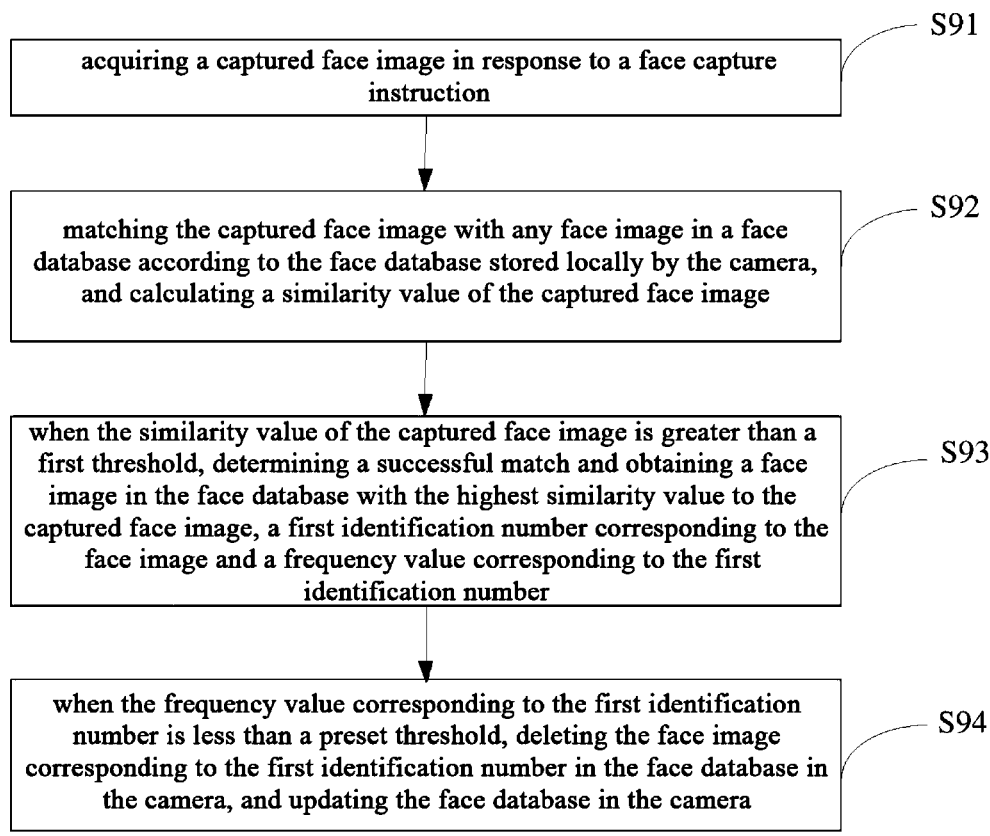
FIG. 9 is a flow diagram of a first embodiment of a method for updating a face database in a camera provided by the present application.

Exemplarily, in another example of the present application, FIG. 9 is a flow diagram of a first embodiment of a method for updating a face database in a camera provided by the present application. As shown in FIG. 9, in the embodiment, the method may include the following steps.

S91: a captured face image is acquired in response to a face capture instruction.

In the present embodiment, the camera may acquire captured face images under an external trigger. Exemplarily, the camera may acquire a face capture instruction indicated externally, and acquire the captured face images using image sensor of the camera according to the face capture instruction, and accordingly, the processor of the camera processes at least one of the acquired captured face images.

S92: the captured face image is matched with any face image in a face database according to the face database stored locally by the camera, and a similarity value of the captured face image is calculated.

At least two face images are stored in the face database, and each face image uniquely corresponds to an identification number; the identification number is used to indicate a time when a face image corresponding to the identification number is stored in the face database; and the identification number corresponds to a frequency value that is used to indicate number of successful matches for the face image corresponding to the identification number.

Exemplarily, the identification number may include a serial identification number of the camera, a random value and a time when the corresponding face image is stored in the face database.

In the present embodiment, the camera locally maintains a face database, in which part of images captured by the camera are stored. Usually, at least two face images in the face database are obtained by acquiring faces of different users. Specifically, each face image uniquely corresponds to an identification number and a frequency value.

Therefore, when the camera acquires a new captured face image, the captured face image may be matched with the face images in the local face database to determine the similarity value of the captured face image, so as to judge whether the face database needs to be updated.

S93: when the similarity value of the captured face image is greater than a first threshold, a successful match is determined, and a face image in the face database with the highest similarity value to the captured face image, a first identification number corresponding to the face image and a frequency value corresponding to the first identification number are obtained.

In the present embodiment, when the similarity value of the captured face image is greater than the first threshold, it indicates that there is a face image in the face database whose content is basically consistent with the content of the captured face image, therefore, in order to avoid repeated storage of images with the same content, it is necessary to determine the face image in the face database with the highest similarity value to the captured face image, and accordingly, determine the first identification number corresponding to the face image with the highest similarity value and the frequency value corresponding to the first identification number.

Further, in the embodiment of the present application, after obtaining the first identification number, the method further includes: sending the captured face image and the first identification number to the server.

By sending the captured face image and the first identification number to the server together, the server may determine the previous processing result of the matching image corresponding to the captured face image according to the identification number, thus simplifying the processing operation of the server.

S94: when the frequency value corresponding to the first identification number is less than a preset threshold, the face image corresponding to the first identification number is deleted in the face database in the camera, and the face database in the camera is updated.

In the present embodiment, the preset threshold corresponding to the frequency value may be used as a judgement condition to indicate whether the face image is allowed to be stored in the face database. When the frequency value corresponding to the first identification number is less than the preset threshold, it indicates that the face image may be mistakenly stored in the face database or the target corresponding to the image does not often appear in the area where the camera is located. At this time, the face image corresponding to the first identification number may be deleted in the face database in the camera and the face database in the camera may be updated, thus ensuring the high accuracy of images stored in the face database.

Those skilled in the art should understand that the execution process of step S94 is triggered after the camera runs for a period of time, or is directed to a scene where the remaining storage space of the face database is insufficient, that is, less than a preset capacity threshold.

Optionally, S94: deleting the face image corresponding to the first identification number in the face database in the camera and updating the face database in the camera when the frequency value corresponding to the first identification number is less than the preset threshold includes: in the case that the storage period of the face image corresponding to the first identification number is greater than a preset time and/or the remaining storage space of the face database in the camera is less than a preset capacity threshold, when the frequency value corresponding to the first identification number is less than the preset threshold, deleting the face image corresponding to the first identification number in the face database in the camera and updating the face database in the camera.

Optionally, in a possible design of the present embodiment, before S94, the method may further execute the following operations first, and then execute S94. That is, after S93, to the frequency value corresponding to the first identification number is 1 is added, and the frequency value after the calculation is recorded, so as to update the frequency value corresponding to the first identification number.

Accordingly, S94 may be replaced by the following steps:
deleting the face image corresponding to the first identification number in the face database in the camera when the calculated frequency value is less than the preset threshold.

Comparing the calculated frequency value with the preset threshold, which facilities to improve the accuracy of judging whether the images stored in the database are accurate or not.

The method according to the embodiment of the present application includes: acquiring a captured face image in response to a face capture instruction; matching the captured face image with any face image in a face database according to the face database stored locally by the camera, and calculating a similarity value of the captured face image; when the similarity value of the captured face image is greater than a first threshold, determining a successful match, and obtaining a face image in the face database with the highest similarity value to the captured face image, a first identification number corresponding to the face image and a frequency value corresponding to the first identification number; deleting the face image corresponding to the first identification number in the face database in the camera and updating the face database in the camera when the frequency value corresponding to the first identification number is less than a preset threshold, thus ensuring the accuracy of images stored in the face database and improving the accuracy of image comparison results.

Figure 10:
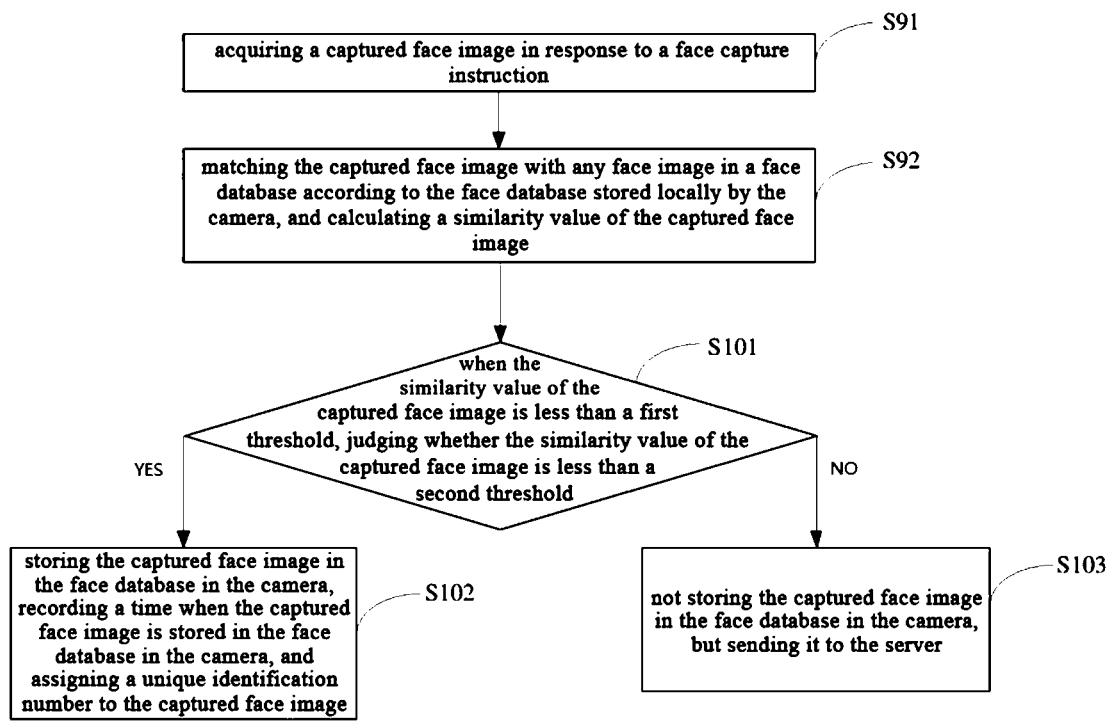
FIG. 10 is a flow diagram of a second embodiment of a method for updating a face database in a camera provided by the present application.

Exemplarily, based on the embodiment, FIG. 10 is a flow diagram of a second embodiment of a method for updating a face database in a camera provided by the present application. As shown in FIG. 10, in the present embodiment, the method may further include the following steps.

S101: when the similarity value of the captured face image is less than a first threshold, whether the similarity value of the captured face image is less than a second threshold is judged, if the similarity value of the captured face image is less than the second threshold, step S102 is executed, if the similarity value of the captured face image is greater than or equal to the second threshold, step S103 is executed.

It should be understood that S101 may be executed after S92, that is, when the similarity value of the captured face image is less than the first threshold, then the similarity value of the captured face image is compared with the second threshold, and then corresponding operations are executed according to the comparison result.

S102: the captured face image is stored in the face database in the camera, a time when the captured face image is stored in the face database in the camera is recorded, and a unique identification number is assigned to the captured face image.

The second threshold is less than or equal to the first threshold.

In the present embodiment, when the similarity value of the captured face image is less than the second threshold, it indicates that there is no image in the face database whose content is consistent with content of the captured face image, at this time the captured face image may be stored in the face database in the camera. In addition, in order to facilitate the subsequent maintenance of the face database, a time when the captured face image is stored in the face database in the camera may be recorded, and a unique identification number may be assigned to the captured face image to uniquely identify the captured face image.

S103: the captured face image is not stored in the face database in the camera, but sent to the server.

In the present embodiment, when the similarity value of the captured face image is greater than or equal to the second threshold, it indicates that there is already an image in the face database whose content is consistent with content of the captured face image. In order to avoid repeated storage of the face images, the captured face image is not stored in the face database in the camera, but sent to the server, so that the server may perform corresponding processing on the captured face image.

According to the method of the present embodiment, when the similarity value of the captured face image is less than the first threshold, the similarity value of the captured face image is compared with the second threshold, and when the similarity value of the captured face image is less than the second threshold, the captured face image is stored in the face database in the camera. The time when the captured face image is stored in the face database in the camera is recorded; and a unique identification number is assigned to the captured face image.

Furthermore, in an embodiment of the present application, the method may further include the following steps:
periodically acquiring frequency values corresponding to all face images in the face database in the camera; and
deleting face images whose frequency value is less than a preset frequency value, and updating the face database in the camera.

Furthermore, in an embodiment of the present application, the method may further include: generating a data packet in response to a received display instruction about the face database, the data packet is used to display the face image corresponding to the display instruction in the face database.

In the present embodiment, the camera may also acquire the display instruction about the face database sent externally, and sort and count the images in the face database based on the display instruction to generate a data packet, so that the camera may transmit the data packet to a display device connected to the camera, so that the display device displays the face image corresponding to the display instruction in the face database.

The method for updating the face database in the camera according to the embodiment of the present application, the camera may maintain and update the local face database automatically, which reduces process of the repeated image processing, improves the automation degree of the camera and the accuracy of image comparison results. Furthermore, the camera may assign a unique identification number corresponding to each face image, and the image transmitted to the server also carries the identification number.

The camera in the embodiment, i.e., the network camera in the above-mentioned embodiments, and the face database in the present application is also the second storage unit of the memory in the above-mentioned embodiments. For the detailed description in present embodiment, please refer to the record in the above embodiments, which will not be repeated here.

Figure 11:
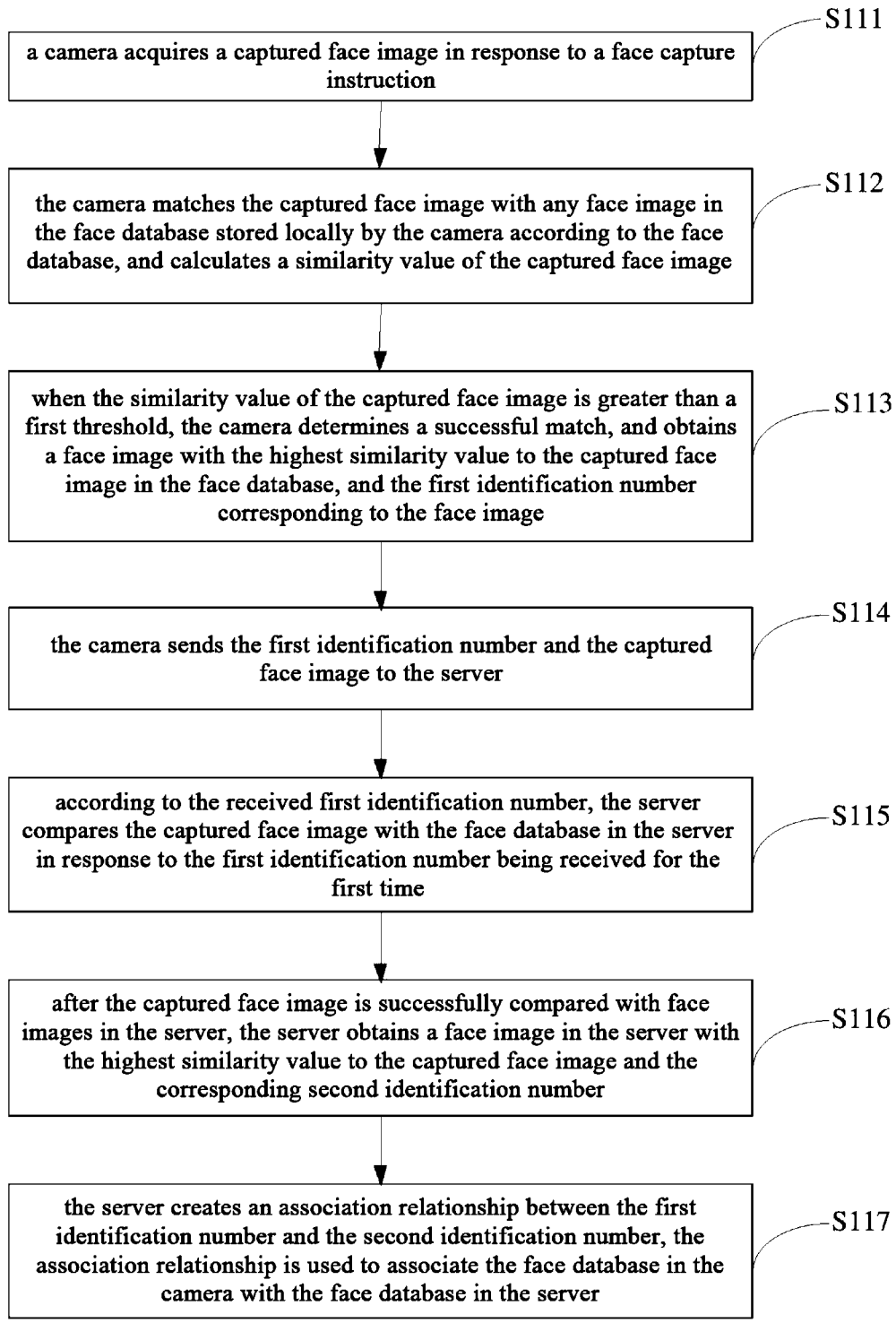
FIG. 11 is a flow diagram of an embodiment of a method for associating a face database in a camera with a face database in a server provided by the present application.

Exemplarily, in another embodiment of the present application, FIG. 11 is a flow diagram of an embodiment of a method for associating a face database in a camera with a face database in a server provided by the present application. As shown in FIG. 11, in the present embodiment, the method may include the following steps.

S111: a camera acquires a captured face image in response to a face capture instruction.

S112: the camera matches the captured face image with any face image in the face database stored locally by the camera according to the face database, and calculates a similarity value of the captured face image.

At least two face images are stored in the face database, and each captured face image uniquely corresponds to an identification number; the identification number is used to indicate a time when a face image corresponding to the identification number is stored in the face database in the camera. Optionally, the identification number corresponds to a frequency value that is used to indicate the number of successful matches for the face image corresponding to the identification number.

S113: when the similarity value of the captured face image is greater than a first threshold, the camera determines a successful match, and obtains a face image with the highest similarity value to the captured face image in the face database, and the first identification number corresponding to the face image.

S114: the camera sends the first identification number and the captured face image to the server.

S115: according to the received first identification number, the server compares the captured face image with the face database in the server in response to the first identification number being received for the first time.

Each face image in the face database in the server uniquely corresponds to a second identification number.

S116: after the captured face image is successfully compared with face images in the server, the server obtains a face image in the server with the highest similarity value to the captured face image and the corresponding second identification number.

S117: the server creates an association relationship between the first identification number and the second identification number, the association relationship is used to associate the face database in the camera with the face database in the server.

In a possible implementation, the method for associating the face database in the camera with the face database in the server further includes: when storage time of a face image in the face database is longer than a first preset time and the number of successful matches corresponding to the identification number of the face image is less than a preset threshold, deleting the face image in the face database, and/or when remaining storage space of the face database is less than a preset capacity threshold, deleting a face image for which the number of successful matches corresponding to the identification number is less than the preset threshold in the face database.

In the embodiment of the application, after acquiring a captured face image, the camera matches the captured face image with any face image in the face database stored locally by the camera according to the face database; calculates a similarity value of the captured face image; when the similarity value of the captured face image is greater than a first threshold, determines a successful match; and obtains a face image with the highest similarity value to the captured face image in the face database, and the first identification number corresponding to the face image, and sends the first identification number and the captured face image to the server, correspondingly, the server compares the captured face image with the face database in the server according to the received first identification number in response to the first identification number being received for the first time, and after the captured face image is successfully compared with face images in the server, obtains a face image in the server with the highest similarity value to the captured face image and a corresponding second identification number, and creates an association relationship between the first identification number and the second identification number, the association relationship is used to associate the face database in the camera with the face database in the server.

It should be understood that the specific implementation of some steps in the present embodiment can be referred to the description in any of the above embodiments, and all the details in the present embodiment can be referred to the description in the above embodiments, which will not be repeated here.

Finally, it should be noted that the above embodiments are only used to illustrate the technical solution of the present application, but not to limit it; although the application has been described in detail with reference to the foregoing embodiments, those skilled in the art should understand that the technical solutions described in the foregoing embodiments can still be modified, or some or all of the technical features can be equivalently replaced; and these modifications or replacements do not make the essence of the corresponding technical solutions deviate from the scope of the technical solutions of each embodiment of the present application.

The above are only preferred embodiments of this application, and should not intended to limit present application. Any modification, equivalent replacement, improvement, etc. made within the spirit and principle of the present application shall be included in the scope of protection of the present application.

What is claimed is:

1. A network camera comprising an image sensor, a processor, a memory and a network communication interface; the memory comprises a first storage unit and a second storage unit;

the image sensor is configured for acquiring images of a monitoring scene;

the first storage unit is configured for storing all images acquired by the image sensor, and the second storage unit is configured for storing a part of the images acquired by the image sensor, the part of the images is a subset of all images;

the processor is configured for:

matching a current image acquired by the image sensor with an image stored in the second storage unit to obtain a similarity value representing a matching result, and comparing the similarity value with a first similarity threshold indicated externally and a second similarity threshold indicated externally;

when the similarity value is less than the first similarity threshold but greater than the second similarity threshold, sending the current image to a server with a matching failure message through the network communication interface;

when the similarity value is less than the first similarity threshold and less than the second similarity threshold, sending the current image to the server with a matching failure message through the network communication interface, assigning a uniquely associated device target identifier to the current image, and storing the current image in the second storage unit;

wherein, the first similarity threshold is greater than the second similarity threshold, the device target identifier is generated based on a time when the current image is stored in the second storage unit, a flag number of the network camera and a random value.

2. The network camera according to claim 1, wherein the processor is specifically configured for acquiring an image quality of the current image when the similarity value is less than the first similarity threshold and less than the second similarity threshold, and when the image quality is greater than a preset image quality, sending the current image to a server with a matching failure message through the network communication interface, assigning a uniquely associated device target identifier to the current image, and storing the current image in the second storage unit.

3. The network camera according to claim 1, wherein the processor is further configured for comparing the similarity value with a third similarity threshold indicated externally, acquiring image quality of the current image when the similarity value is greater than the third similarity threshold, and when the image quality is greater than an image quality of a matching image corresponding to the current image, replacing the matching image in the second storage unit with the current image and taking a device target identifier for the matching image as the device target identifier for the current image, wherein the third similarity threshold is greater than the first similarity threshold.

4. The network camera according to claim 1, wherein the processor is further configured for determining a current storage amount of the second storage unit and a first ratio of images in the second storage unit, and adjusting the second similarity threshold according to the current storage amount, the first ratio and a upper limit value for image storage of the second storage unit indicated externally, wherein the first ratio is used to indicate a ratio of the number of target objects corresponding to the current storage amount to the current storage amount;

the processor is further configured for replacing an image with the lowest number of successful matches in the second storage unit with the current image when the current storage amount is equal to the upper limit value for image storage.

5. The network camera according to claim 1, wherein the processor is further configured for, when the similarity value is greater than or equal to the first similarity threshold, determining a current time as a current successful matching time, judging whether a time difference between the current successful matching time and the latest successful matching time is greater than or equal to a preset time difference, if the time difference between the current successful matching time and the latest successful matching time is greater than or equal to a preset time difference, sending the current image to the server with a matching success message through the network communication interface, and updating the latest successful matching time to the current successful matching time, and increasing the number of successful matches for the matching image corresponding to the current image by one.

6. The network camera according to claim 5, wherein the processor is further configured for periodically obtaining the number of successful matches for each image in the second storage unit within a preset time period, retaining an image whose number of successful matches is greater than or equal to a threshold number of successful matches indicated externally, and deleting an image whose number of successful matches is less than the threshold number of successful matches indicated externally.

7. The network camera according to claim 1, wherein the processor is further configured for sorting the images in the second storage unit according to an image sorting instruction indicated externally in response to the image sorting instruction, to obtain a sorting result, the image sorting instruction is used to indicate a sorting mode for the images in the second storage unit, and the sorting mode comprises any one of the following: number of successful matches, successful matching time and storage time.

8. The network camera according to claim 7, wherein the processor is further configured for, in response to a display instruction for a target image issued externally, obtaining a plurality of similar images whose similarity with the target image is greater than the first similarity threshold from the first storage unit based on the display instruction, so as to display the target image and the plurality of similar images.

9. A video monitoring system comprising: at least one network camera and a server, a communication connection between each camera and the server is established through a network;

for any network camera in the at least one network device, the network camera comprises an image sensor, a first processor, a first memory and a first network communication interface, wherein the first memory comprises a first storage unit and a second storage unit;

the image sensor is configured for acquiring images of monitored scenes;

the first storage unit is configured for storing all images acquired by the image sensor, and the second storage unit is configured for storing a part of the images acquired by the image sensor, the part of the images is a subset of all images;

the first processor is configured for:

matching a current image acquired by the image sensor with an image stored in the second storage unit to obtain a similarity value representing a matching result, comparing the similarity value with a first similarity threshold indicated externally and a second similarity threshold indicated externally, and when the similarity value is less than the first similarity threshold but greater than the second similarity threshold, sending the current image to a server with a matching failure message through the first network communication interface, and when the similarity value is less than the first similarity threshold and less than the second similarity threshold, sending the current image to the server with the matching failure message through the network communication interface, assigning a uniquely associated device target identifier to the current image, and storing the current image in the second storage unit, wherein, the first similarity threshold is greater than the second similarity threshold, and the device target identifier is generated based on a time when the current image is stored in the second storage unit, a flag number of the network camera and a random value;

wherein the server comprises a second network communication interface, a second processor and a second memory;

the second processor is configured for receiving the matching failure message sent by the network camera through the second network communication interface, judging whether there is an image in the second memory whose device target identifier is consistent with the device target identifier for the current image, if there is no image in the second memory whose device target identifier is consistent with the device target identifier for the current image, assigning a uniquely associated platform target identifier to the current image, establishing a correspondence between the device target identifier and the matching failure message, and storing the platform target identifier and the correspondence; if there is an image in the second memory whose device target identifier is consistent with the device target identifier for the current image, obtaining a platform target identifier for the matching image corresponding to the current image in the second memory, establishing a mapping relationship between the device target identifier and the platform target identifier, and storing the mapping relationship in the second memory.

10. A method for updating a face database in a camera comprising:

acquiring a captured face image in response to a face capture instruction;

matching the captured face image with any face image in the face database stored locally by the camera according to the face database, and calculating a similarity value of the captured face image; wherein, at least two face images are stored in the face database, and each face image uniquely corresponds to an identification number; wherein the identification number is used to indicate a time when the face image corresponding to the identification number is stored in the face database; and the identification number corresponds to a frequency value that is used to indicate the number of successful matches for the face image corresponding to the identification number;

when the similarity value of the captured face image is greater than a first threshold, determining a successful match, and obtaining a face image with the highest similarity value to the captured face image in the face database, a first identification number corresponding to the face image and a frequency value corresponding to the first identification number;

when the frequency value corresponding to the first identification number is less than a preset threshold, deleting the face image corresponding to the first identification number in the face database in the camera to update the face database in the camera.

11. The method according to claim 10, wherein the method further comprises:

when the similarity value of the captured face image is less than the first threshold, comparing the similarity value of the captured face image with a second threshold;

when the similarity value of the captured face image is less than the second threshold, storing the captured face image in the face database in the camera, recording a time when the captured face image is stored in the face database in the camera, and assigning a unique identification number to the captured face images; wherein the second threshold is less than or equal to the first threshold.

12. The method according to claim 11, wherein the method further comprises:

when the similarity value of the captured face image is greater than the second threshold, sending the captured face image to a server, without storing the captured face image in the face database in the camera.

13. The method according to claim 10, wherein the identification number comprises a serial identification number of the camera, a random value and a time when the corresponding face image is stored in the face database.

14. The method according to claim 13, wherein before deleting the face image corresponding to the first identification number in the face database in the camera when the frequency value corresponding to the first identification number is less than the preset threshold, the method comprises:

performing add-one operation on the frequency value corresponding to the first identification number by one, and recording the frequency value after the operation;

accordingly, when the frequency value corresponding to the first identification number is less than the preset threshold, deleting the face image corresponding to the first identification number in the face database in the camera comprises:

deleting the face image corresponding to the first identification number in the face database in the camera when the frequency value after the operation is less than the preset threshold.

* * * * *